United States Patent [19]

Masamoto et al.

[11] Patent Number: 5,191,020
[45] Date of Patent: Mar. 2, 1993

[54] POLYPHENYLENE SULFIDE RESIN COMPOSITION

[75] Inventors: Junzo Masamoto, Kurashiki; Tetsuo Nakamoto, Yokohama; Kimihiro Kubo, Kurashiki, all of Japan

[73] Assignee: Asahi Kasei Kogyo Kabushiki Kaisha, Osaka, Japan

[21] Appl. No.: 524,613

[22] Filed: May 17, 1990

[30] Foreign Application Priority Data

| Jul. 5, 1989 | [JP] | Japan | 1-171913 |
| Jul. 21, 1989 | [JP] | Japan | 1-187457 |
| Jul. 21, 1989 | [JP] | Japan | 1-187458 |
| Oct. 25, 1989 | [JP] | Japan | 1-276134 |

[51] Int. Cl.$^5$ ............ C08R 81/02; C08G 75/14
[52] U.S. Cl. .................... 525/189; 525/123; 525/537
[58] Field of Search ............ 525/189, 123, 537

[56] References Cited

U.S. PATENT DOCUMENTS

| 4,889,893 | 12/1989 | Kobayashi et al. | 525/189 |
| 5,026,764 | 6/1991 | Okabe et al. | 525/537 |
| 5,028,656 | 7/1991 | Okabe et al. | 525/537 |

FOREIGN PATENT DOCUMENTS

| 0345094 | 12/1989 | European Pat. Off. |
| 2617176 | 12/1988 | France |
| 57-168945 | 10/1982 | Japan |
| 63-056559 | 3/1988 | Japan |
| 1-118571 | 5/1989 | Japan |
| 02127470 | 5/1990 | Japan |
| 00181 | 1/1989 | PCT Int'l Appl. |
| 2218996A | 11/1989 | United Kingdom |

OTHER PUBLICATIONS

WPIL, File Supplier, AN=89-181491, Derwent Publications Ltd,; & JP-A-1 118 571.
Patent Abstracts of Japan, vol. 11, No. 381, Dec. 12, 1987.
Patent Abstracts of Japan, vol. 12, No. 365, Sep. 29, 1988.
Patent Abstracts of Japan, vol. 13, No. 472, Oct. 25, 1988.
Patent Abstracts of Japan, vol. 12, No. 433, Nov. 15, 1988.
Patent Abstracts of Japan, vol. 14, No. 215, May 8, 1990.
Patent Abstracts of Japan, vol. 8, No. 283, Dec. 25, 1984.

*Primary Examiner*—John C. Bleutge
*Assistant Examiner*—Helen F. Lee
*Attorney, Agent, or Firm*—Armstrong, Westerman, Hattori, McLeland & Naughton

[57] ABSTRACT

A composition obtained by adding at least one specific elastomer and optionally a polyamide resin or a bromine-containing flame retardant to a melt-kneaded product of a polyphenylene sulfide with a non-blocked type polyfunctional isocyanate compound. The composition is excellent not only in impact resistance but also in aging resistance at high temperatures. Said composition can be advantageously used for molding parts of automobile engines, parts for various machines, connectors for electric or electronic parts, bobbines and the like.

5 Claims, 1 Drawing Sheet

F I G. 1

POLYPHENYLENE SULFIDE RESIN COMPOSITION

BACKGROUND OF INVENTION

1. Field of Invention

The present invention relates to a polyiphenylene sulfide resin (PPS) composition possessing improved impact properties and, more particularly, to a polyphenylene sulfide resin composition comprising a polyphenylene sulfide resin containing a non-blocked type polyfunctional isocyanate compound melt-kneaded therewith and at least one specific elastomer.

2. Related Art Statement

As polyphenylene sulfide resin compositions possessing improved impact properties, the following have heretofore been disclosed.

Jap. Pat. Appln. Kokai (Laid-Open) No. 59-207921 discloses a composition comprising a blend of a polyphenylene sulfide resin, an α-olefin copolymer elastomer obtained by graft copolymerization of an unsaturated carboxylic acid, an anhydride thereof or a derivative of either of them, and an epoxy resin.

Jap. Pat. Appln. Kokai (Laid-Open) Nos. 58-1547 and 59-152953 disclose compositions comprising a polyphenylene sulfide resin and an ethylene-glycidyl methacrylate copolymer.

Jap. Pat. Appln. Kokai (Laid-Open) No. 63-95265 discloses a composition comprising a polyphenylene sulfide resin and a polyisobutylene.

Jap. Pat. Appln. Kokai (Laid-Open) No. 62-151460 discloses a composition obtained by adding an ethylene copolymer obtained from ethylene, an α,β-unsaturated carboxylic acid alkyl ester and maleic anhydride to a polyphenylene sulfide.

Jap. Pat. Appln. Kokai (Laid-Open) No. 63-161057 proposes a resin composition comprising a polyphenylene sulfide resin and a reaction product of a hydrogenated polymer of a diene with an α,β-unsaturated carboxylic acid glycidyl ester, or a hydrogenated copolymer of a diene and an aromatic vinyl compound.

Jap. Pat. Appln. Kokai (Laid-Open) No. 2-49062 proposes addition of an ionomer to PPS.

Jap. Pat. Appln. Kokai (Laid-Open) No. 63-118369 proposes addition of a maleic acid-modified hydrogenated butadiene-styrene block copolymer to PPS.

Jap. Pat. Appln. Kokai (Laid-Open) No. 1-185366 proposes a composition comprising a glycidyl ester-modified hydrogenated butadiene-styrene block copolymer and PPS.

The compositions disclosed in the above references, however, do not possess sufficiently improved impact resistance.

In detail, as heretofore known, the molecular chains of polyphenylene sulfide resins are not sufficiently reactive, so that when a highly reactive rubber component such as a copolymer as disclosed in the above references or a highly reactive epoxy resin is blended with the PPS, the compatibility between the rubber component or the epoxy resin and the polyphenylene sulfide resin is insufficient. Therefore, a sufficient impact-resistance-improving effect cannot be obtained.

SUMMARY AND OBJECT OF THE INVENTION

Accordingly, the present inventor earnestly investigated how to improve the compatibility between polyphenylene sulfide resin and rubber, and found that this problem can be solved by blending a specific rubber component with a polyphenylene sulfide resin subjected to a specific treatment, whereby the present invention was accomplished.

That is, the present invention provides a polyphenylene sulfide resin composition possessing improved impact properties which comprises (A) a polyphenylene sulfide resin containing as an essential constituent a non-blocked type polyfunctional isocyanate compound melt-kneaded therewith, and (B) at least one member selected from the group consisting of (1) an ethylene copolymer comprising 50 to 90% by weight of ethylene units, 5 to 49% by weight of α,β-unsaturated carboxylic acid alkyl ester units and 0.5 to 10% by weight of maleic anhydride units, (2) an olefin copolymer obtained from an α-olefin and an α,β-unsaturated acid glycidyl ester, (3) an olefin copolymer obtained from an α-olefin and an α,β-unsaturated acid, (4) an ionomer, (5) an α-olefin copolymer elastomer obtained by graft copolymerizing an unsaturated carboxylic acid, an anhydride thereof or a derivative of either of them onto an α-olefin polymer in an amount of 0.05 to 10.0% by weight based on the weight of the α-olefin polymer, (6) a modified hydrogenated elastomer obtained by graft copolymerizing an unsaturated carboxylic acid, an anhydride thereof or a derivative of either of them onto a hydrogenated polymer of one or more conjugated dienes or onto a hydrogenated copolymer of a conjugated diene and an aromatic vinyl hydrocarbon in an amount of 0.05 to 10% by weight based on the weight of the hydrogenated polymer or the hydrogenated copolymer, and (7) a modified polymer obtained by reacting an α,β-unsaturated acid glycidyl ester with a hydrogenated polymer of one or more conjugated dienes or with a hydrogenated copolymer of a conjugated diene and an aromatic vinyl hydrocarbon.

The present composition can be used for molding parts of automobile engines, parts for various machines, connectors for electric or electronic parts, bobbines and the like.

BRIEF DESCRIPTION OF THE DRAWING

FIG. 1 shows a scanning electron micrograph of the particle structure of an olefin copolymer in a test piece obtained in Example 2.

DETAILED DESCRIPTION OF PREFERRED EMBODIMENTS

The polyphenylene sulfide resin (hereinafter frequently referred to as PPS) used in the present invention is a polymer comprising 70 mole% or more, preferably 90 mole% or more, of recurring units of the structural formula:

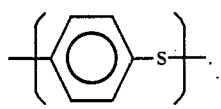

When the proportion of above recurring units is less than 70 mole%, the heat resistance is deteriorated.

As PPS's useful in the present invention, there are polymers having a relatively low molecular weight obtained by a production process as represented by the process disclosed in Jap. Pat. Pub. No. 45-3368, and substantially linear polymers having a relatively high molecular weight obtained by a production process as represented by the process disclosed in Jap. Pat. Pub. No. 52-12240. The polymer obtained by the process of Jap. Pat. Pub. No. 45-3368 can be used also after being increased in polymerization degree by heating under an oxygen atmosphere in the presence of a crosslinking agent such as a peroxide after polymerization. That is, the PPS used in the present invention is not limited by its production process.

In addition, 30 mole% or less of the recurring units of the PPS may be recurring units of any of the following structural formulas:

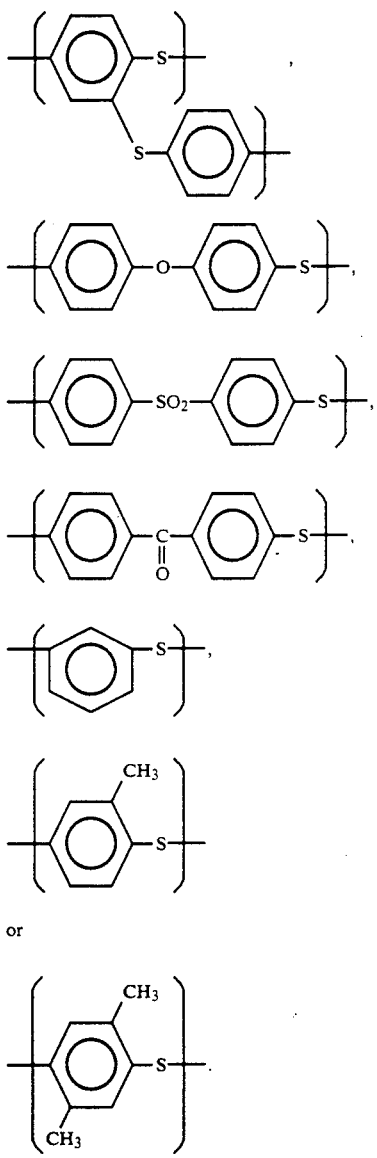

or

Although the melt viscosity of the PPS used in the present invention is not critical so long as it permits production of a molded product, a PPS having a melt viscosity of 100 poise or more is preferably used from the viewpoint of the toughness of the PPS itself, and a PPS having a melt viscosity of 10,000 poise or less is preferably used from the viewpoint of moldability. The melt viscosity is most preferably in the range of 1,000 to 5,000 poise.

Conventional additives such as antioxidants, heat stabilizers, lubricants, nucleating agents, ultraviolet absorbers, colorants, etc. and a small amount of other resinous or rubbery polymers can be added to the PPS used in the present invention, so long as they do not lessen the effect of the present invention.

In addition, for adjusting the polymerization degree of the PPS, there can be used a blend of a conventional peroxide type crosslinking agent and a crosslinking accelerator such as the thiophosphinic acid metal salt described in Jap. Pat. Appln. Kokai (Laid-Open) No. 59-131650, or a crosslinking inhibitor such as the dialkyltin dicarboxylate or aminotriazole described in Jap. Pat. Appln. Kokai (Laid-Open) Nos. 58-204045 and 58-204046, etc.

A method for blending a polyfunctional isocyanate with a PPS has already been known. For example, addition of an isocyanate to a PPS in an amount of 0.1 to 10% by weight has been disclosed in the right, bottom column on page 3 of Jap. Pat. Appln. Kokai (Laid-Open) No. 57-168945. However, this reference does not suggest an impact-resistant PPS obtained by blending with a special elastomer.

A preferable embodiment of the present invention is incorporation of at least one specific elastomer into a resin obtained by melt-kneading a polyphenylene sulfide resin and a non-blocked type polyfunctional isocyanate compound in proportions of 95 to 99.9% by weight of the PPS and 0.1 to 5% by weight of the isocyanate.

The non-blocked type polyfunctional isocyanate compound used in the present invention includes isocyanate compounds having two or more non-blocked type isocyanate residues in the molecule, namely, non-blocked type polyfunctional isocyanate or isothiocyanate compounds of the general formula:

$$R-(N=C=O)_n \text{ or } R-(N=C=S)_n$$

wherein R is an organic radical such as alkyl alicylic hydrocarbon residues, aryl hydrocarbon residues, arylalkyl hydrocarbon residues; those which may be substituted by $C_1$–$C_{10}$ alkoxy group(s), phenoxy group, $NO_2$, or halogen atom(s); or hydrocarbon residues directly-bonded-among substituted- or unsubstituted-alkyl alicyclic, aryl or arylalkyl hydrocarbon residues, or hydrocarbon residues formed among said three hydrocarbon residues bonded through the group(s) selected from

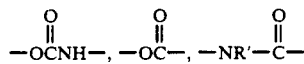

(wherein R' is hydrogen or a $C_1$–$C_{10}$ alkyl group), —S—, —SO—, —$SO_2$—, —NR'— (wherein R' is hydrogen or a $C_1$–$C_{10}$ alkyl group),

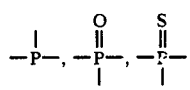

or the like, and n is an integer of 2 to 10.

In general, these non-blocked type polyfunctional isocyanate compounds are divided into two groups, i.e., the aliphatic form and the aromatic form. Their modified forms include the dimer form, trimer form (isocyanurate form), polymer form, carbodiimide-modified form, etc. In the present invention, any of the these isocyanate compounds can be used.

However, there cannot be used blocked isocyanates (or masked isocyanates), i.e., blocked type isocyanate compounds obtained by reacting an isocyanate with acidic sodium sulfite, phenol, cresol, a lactam, a heterocyclic compound, hydrocyanic acid, a sulfite or the like, followed by regeneration at a high temperature, because they are hardly effective for the object of the present invention.

Specific examples of the non-blocked type polyfunctional isocyanate compound are 4,4'-diphenylmethane diisocyanate, 4,4-diphenylpropane diisocyanate, carbodiimide-modified diphenylmethane diisocyanate, naphthylene 1,5-diisocyanate, toluene diisocyanate, dimerized toluene diisocyanate, hexamethylene diisocyanate, trimerized hexamethylene diisocyanate, pentamerized hexamethylene diisocyanate, heptamerized hexamethylene diisocyanate, polymethylene polyphenyl polyisocyanate, phenylene diisocyanate, 3,3'-dimethyl-diphenylmethane-4,4'-diisocyanate, 3,3'-dimethyl-4,4'-diphenylene diisocyanate, 3,3'-bitoluene-4,4'-diisocyanate, xylene diisocyanate, isophorone diisocyanate, triphenylmethane triisocyanate, lysine diisocyanate, dicyclohexyldimethylmethane diisocyanate, diethylfumarate diisocyanate, triisocyanatobenzene, triisocyanatonaphthalene, bis(4-isocyanatophenyl) ether, bis(4-isocyanatophenyl) thioether, bis(4-isocyanatophenyl) sulfone, tris(4-isocyanatophenyl) phosphite, tris(4-isocyanatophenyl) phosphate, compounds having isothiocyanate residues which correspond to these compounds, and hydrogenated products of the above aromatic isocyanate compounds.

For the melt-keading in the present invention, there can be used conventional apparatus usually used for kneading molten resins, for example, kneaders, roll mills, extruders, etc. As to the kind of the extruder, the composition of the present invention can be obtained by using any of a single screw extruder, a twin screw extruder, a Ko-kneader (Buss Corporation), etc.

The kneading temperature is higher than the melting point of the polyphenylene sulfide resin, and the kneading can be sufficiently conducted in a conventional temperature range of 280° to 340° C. It is preferable to subject the polyphenylene sulfide resin to predrying as a pretreatment and conduct the kneading in an inert gas atmosphere.

The polyphenylene sulfide resin and the nonblocked type polyfunctional isocyanate compound are melt-kneaded in proportions of 95 to 99.9% by weight and 0.1 to 5% by weight, respectively, and preferably in proportions of 97 to 99% by weight and 1 to 3% by weight, respectively. Said isocyanate compound is considered to function effectively as a crosslinking agent for crosslinking molecules of the polyphenylene sulfide resin to one another. When its mixing proportion is less than 0.1% by weight, the modifying effect in the present invention is lessened. On the other hand, when the mixing proportion is more than 5% by weight, a brittle product tends to be obtained probably because the degree of crosslinking is too great.

The specific elastomer(s) used in the present invention include (1) ethylene copolymers comprising 50 to 90% by weight of ethylene units, 5 to 49% by weight of $\alpha,\beta$-unsaturated carboxylic acid alkyl ester units and 0.5 to 10% by weight of maleic anhydride units, (2) olefin copolymers obtained from an $\alpha$-olefin and an $\alpha,\beta$-unsaturated acid glycidyl ester, (3) olefin copolymers obtained from an $\alpha$-olefin and an $\alpha,\beta$-unsaturated acid, (4) ionomers, (5) $\alpha$-olefin copolymer elastomers obtained by graft copolymerizing an unsaturated carboxylic acid, an anhydride thereof or a derivative of either of them onto an $\alpha$-olefin polymer in an amount of 0.05 to 10.0% by weight based on the weight of the $\alpha$-olefin polymer, (6) modified hydrogenated elastomers obtained by graft copolymerizing an unsaturated carboxylic acid, an anhydride thereof or a derivative of either of them onto a hydrogenated polymer of one or more conjugated dienes or onto a hydrogenated copolymer of a conjugated diene and an aromatic vinyl hydrocarbon in an amount of 0.05 to 10% by weight based on the weight of the hydrogenated polymer or the hydrogenated copolymer, and (7) modified polymers obtained by reacting an $\alpha,\beta$-unsaturated acid glycidyl ester with a hydrogenated polymer of one or more conjugated dienes or with a hydrogenated copolymer of a conjugated diene and an aromatic vinyl hydrocarbon.

Of these, particularly preferable elastomers are:

(1) ethylene copolymers comprising 50 to 90% by weight of ethylene units, 5 to 49% by weight of $\alpha,\beta$-unsaturated carboxylic acid alkyl ester units and 0.5 to 10% by weight of maleic anhydride units.

Preferable elastomers second to them are:

(2) olefin copolymers obtained from an $\alpha$-olefin and $\alpha,\beta$-unsaturated acid glycidyl ester, and (3) olefin copolymers obtained from an $\alpha$-olefin and a $\alpha,\beta$-unsaturated acid.

The individual elastomers are explained below.

Ethylene copolymers comprising 50 to 90% by weight of ethylene units, 5 to 49% by weight of $\alpha,\beta$-unsaturated carboxylic acid alkyl ester units and 0.5 to 10% by weight of maleic anhydride units (hereinafter referred to merely as "ethylene copolymers") are known to be excellent as alloy type elastomers.

As the ethylene copolymer in the present invention, there are preferably used, among such ethylene copolymers, those comprising as monomer constituents 50 to 90% by weight, preferably 60 to 85% by weight, of ethylene units, 5 to 49% by weight, preferably 7 to 45% by weight, of $\alpha,\beta$-unsaturated carboxylic acid alkyl ester units, and 0.5 to 10% by weight, preferably 1 to 8% by weight, of maleic anhydride units.

The $\alpha,\beta$-unsaturated carboxylic acid alkyl ester is an alkyl ester of an unsaturated carboxylic acid having 3 to 8 carbon atoms, for example, an alkyl ester of acrylic acid, methacrylic acid or the like. Specific examples of the $\alpha,\beta$-unsaturated carboxylic acid alkyl ester are methyl acrylate, ethyl acrylate, n-propyl acrylate, isopropyl acrylate, n-butyl acrylate, t-butyl acrylate, isobutyl acrylate, methyl methacrylate, ethyl methacrylate, n-propyl methacrylate, isopropyl methacrylate, n-butyl methacrylate, t-butyl methacrylate, isobutyl methacrylate, etc. Of these, ethyl acrylate, n-butyl acrylate and methyl acrylate are particularly preferable.

As to the molecular weight of the ethylene copolymer, the molecular weight is expressed in terms of a melt index value measured at 190° C. under a load of 2.16 kg. The melt index value of the ethylene copolymer is 0.1 to 1000, preferably 0.2 to 500, and most preferably 1 to 100.

Such ethylene copolymers are commercially available from Sumitomo CdF Chemical Co., Ltd. by the name of "Bondine".

As excellent alloy type elastomers useful in the present invention, there are known olefin copolymers obtained from an α-olefin and an α,β-unsaturated acid glycidyl ester.

Of these olefin copolymers obtained from an α-olefin and an α,β-unsaturated acid glycidyl ester, those in which the α-olefin is ethylene, propylene, butene-1 or the like are preferably used in the present invention. Ethylene is particularly preferable as the α-olefin. As the α,β-unsaturated acid glycidyl ester, there can be used compounds of the general formula:

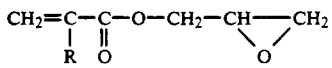

wherein R is a hydrogen atom or a lower alkyl group. Specific examples of the α,β-unsaturated acid glycidyl ester are glycidyl acrylate, glycidyl methacrylate, glycidyl ethacrylate, etc. Of these, glycidyl methacrylate is preferable.

In addition, with the above monomers may be copolymerized one or more other unsaturated monomers copolymerizable therewith, i.e., vinyl ethers, vinyl esters (e.g. vinyl acetate, vinyl propionate, etc.), esters of acrylic acid and methacrylic acid [e.g. methyl (meth)acrylate, ethyl (meth)acrylate, propyl (meth)acrylate, etc.], acrylonitrile, styrene, carbon monoxide, etc.

As to the molecular weight of the olefin copolymer (2), the molecular weight is expressed in terms of a melt index value measured at 190° C. under a load of 2.16 kg. The melt index value of said copolymer is 0.1 to 500, preferably 0.5 to 100, and most preferably 1 to 20.

The proportion of the α,β-unsaturated acid glycidyl ester copolymerized is preferably 0.5 to 40% by weight, particularly 3 to 30% by weight, based on the total weight of monomers for said copolymer. When the proportion is less than 0.5% by weight, no desired effect can be obtained. When it exceeds 40.0% by weight, there are problems, for example, gelation occurs during melt kneading with the PPS, or a seriously discolored composition having an ugly appearance is obtained.

As other suitable alloy type elastomers, there are known olefin copolymers obtained from an α-olefin and an α,β-unsaturated acid.

The olefin copolymer (3) comprising α-olefin units and α,β-unsaturated acid units, i.e., one of the components (B) of the present invention, can be obtained by reacting an α-olefin of the general formula RCH=CH₂ (R is selected from the group consisting of hydrogen and alkyl groups having 1 to 8 carbon atoms) and a carboxylic acid having an α,β-ethylenic unsaturated group and one or two carboxyl groups. Of such copolymers, α-olefin-monocarboxylic acid copolymers are particularly suitable.

Olefin copolymers (3) useful in the present invention include, for example, ethylene-acrylic acid copolymers, ethylene-methacrylic acid copolymers, ethylene-itaconic acid copolymers, ethylene-maleic acid copolymers, ethylene-acrylic acid-methyl methacrylate copolymers, ethylene-methacrylic acid-vinyl acetate copolymers, ethylene-acrylic acid-vinyl alcohol copolymers, ethylene-propylene-acrylic acid copolymers, ethylene-styrene-acrylic acid copolymers, ethylene-methacrylic acid-acrylonitrile copolymers, ethylene-vinyl chloride-acrylic acid copolymers, ethylene-chlorotrifluoroethylene-methacrylic acid copolymers, etc. Of these, ethylene-acrylic acid copolymers and ethylene-methacrylic acid copolymers are preferable.

The proportion of the α,β-unsaturated acid copolymerized with an α-olefin is 3 to 30% by weight, preferably 5 to 20% by weight, and most preferably 7 to 15% by weight, based on the total weight of monomers for the olefin copolymer (3).

Ethylene-methacrylic acid copolymers are particularly preferable copolymers.

As to the molecular weight of the olefin copolymer (3), the molecular weight is expressed in terms of a melt index value measured at 190° C. under a load of 2.16 kg. The melt index value is preferably 0.05 to 1000, more preferably 0.1 to 500, and most preferably 3 to 100.

Examples of such ethylene copolymers are a copolymer commercially available from Mitsui.DuPont Polychemical by the name of Nucrel, and a copolymer commercially available from Mitsubishi Petrochemical by the name of Yukalon.

Ionomers are still other useful alloy type elastomers.

A process for producing an ionomer useful in the present invention has already been generally known (Jap. Pat. Pub. No. 39-6810), and the ionomer is produced by reacting a base copolymer with a metal compound capable of ionizing the base polymer.

The base copolymer is a copolymer obtained from an α-olefin of the general formula RCH=CH₂ (R is selected from the group consisting of hydrogen and alkyl groups having 1 to 8 carbon atoms) and a carboxylic acid having an α,β-ethylenic unsaturated group and one or two carboxyl groups. Of such copolymers, α-olefin-monocarboxylic acid copolymers are particularly suitable.

Base copolymers useful in the present invention include, for example, ethylene-acrylic acid copolymers, ethylene-methacrylic acid copolymers, ethylene-itaconic acid copolymers, ethylene-maleic acid copolymers, ethylene-acrylic acid-methyl methacrylate copolymers, ethylene-methacrylic acid-vinyl acetate copolymers, ethylene-acrylic acid-vinyl alcohol copolymers, ethylene-propylene-acrylic acid copolymers, ethylene-styrene-acrylic acid copolymers, ethylene-methacrylic acid-acrylonitrile copolymers, ethylene-vinyl chloride-acrylic acid copolymers, ethylene-chlorotrifluoroethylene-methacrylic acid copolymers, polyethylene-acrylic acid graft copolymers, polypropylene-acrylic acid graft copolymers, etc.

As metal ions, those having a valence of 1 to 3 (e.g. Na⁺, K⁺, Li⁺, Cu²⁺, Be²⁺, Mg²⁺, Zn²⁺, Al³⁺, etc.) are suitable when the base copolymer is an α-olefin-monocarboxylic acid copolymer. Metal ions having a valence of 1 (e.g. Na⁺, K⁺, Li⁺, etc.) are suitable when the base polymer is an α-olefin-dicarboxylic acid copolymer.

Examples of the ionomer (4) used in the present invention are those obtained by using a combination of an ethylene-acrylic acid copolymer and Na⁺ or Zn²⁺.

The ionomer can be produced by reacting a formate, acetate, hydroxide, methoxide, carbonate or the like of the above-exemplified metal with the above-exemplified base copolymer.

As to the molecular weight of the ionomer, the molecular weight is expressed in terms of a melt index value measured at 190° C. under a load of 2.16 kg. The melt index value is preferably 0.05 to 1000, more preferably 0.1 to 500, and most preferably 3 to 100.

An example of such an ionomer is an ionomer commercially available from Mitsui Polychemical by the name of HI-MILAN.

As still other useful alloy type elastomers, there are known α-olefin copolymer elastomers obtained by graft copolymerization of an unsaturated carboxylic acid, an anhydride thereof or a derivative of either of them.

The α-olefin copolymer elastomer (5) used in the present invention is an α-olefin copolymer obtained by graft copolymerizing an unsaturated carboxylic acid, an anhydride thereof or a derivative of either of them onto an α-olefin polymer.

As the α-olefin polymer as the backbone component, there can be exemplified homopolymers of ethylene, propylene, butene-1, isobutene, pentene-1, 4-methylpentene-1, hexene-1, etc. and copolymers of these monomers with other monomers copolymerizable therewith.

The weight average molecular weight of said α-olefin polymer is 10,000 to 1,000,000, preferably 20,000 to 800,000, more preferably 30,000 to 500,000.

The unsaturated carboxylic acid, anhydride thereof or derivative of either of them, to be graft copolymerized onto the backbone α-olefin polymer includes mainly mono- or dicarboxylic acids of the unsaturated aliphatic series, alicyclic series or the like, anhydrides of these carboxylic acids, and derivative of these carboxylic acids and anhydrides (e.g. imides, amides, substituted derivatives, etc.).

Specific examples of the unsaturated carboxylic acid, anhydride thereof or derivative of either of them are acrylic acid, methacrylic acid, maleic acid, fumaric acid, itaconic acid, crotonic acid, methylmaleic acid, methylfumaric acid, mesaconic acid, citraconic acid, glutaconic acid, methyl hydrogenmaleate, ethyl hydrogenmaleate, methyl hydrogenfumarate, ethyl hydrogenfumarate, methyl itaconate, maleic anhydride, itaconic anhydride, methylmaleic anhydride, citraconic anhydride, endobicyclo-[2,2,1]-5-heptene-2,3-dicarboxylic acid, endobicyclo-[2,2,1]-5-heptene-2,3-dicarboxylic acid anhydride, etc. Of these, maleic anhydride is preferably used.

The proportion of these graft components copolymerized is preferably 0.05 to 10.0% by weight, particularly 0.1 to 5.0% by weight, based on the weight of the backbone α-olefin polymer. When the proportion is less than 0.05% by weight, the desired effect cannot be obtained. When the proportion exceeds 10% by weight, there are various problems, for example, gelation occurs during melt kneading with the PPS, or a seriously discolored composition having an ugly appearance is obtained.

The term "graft copolymerization" used herein means that a portion or the whole of the backbone α-olefin polymer is chemically combined with the unsaturated carboxylic acid, anhydride thereof or derivative of either of them. The α-olefin polymer and the graft component can usually be reacted with each other in a solution, suspended state, slurry state, or molten state by a conventional method.

As still other useful alloy type elastomers, there are known hydrogenated polymers of one or more conjugated dienes or hydrogenated copolymers of a conjugated diene and an aromatic vinyl hydrocarbon, having an unsaturated carboxylic acid, an anhydride thereof or a derivative of either of them, graft copolymerized thereon.

As the elastomer (6) obtained by graft copolymerizing an unsaturated carboxylic acid, an anhydride thereof or a derivative of either of them onto a hydrogenated polymer of one or more conjugated dienes or a hydrogenated copolymer of a conjugated diene and an aromatic vinyl hydrocarbon which is one of the components (B) of the present invention, there are, for example, modified polymers obtained by reacting an unsaturated carboxylic acid, an anhydride thereof or a derivative of either of them with a hydrogenated polymer of one or more conjugated dienes or a hydrogenated copolymer of a conjugated diene and an aromatic vinyl hydrocarbon in an amount of 0.05 to 10% by weight based on the weight of the hydrogenated polymer or the hydrogenated copolymer.

The hydrogenated polymer of one or more conjugated dienes includes polymers derived from one or more conjugated dienes, i.e., homopolymers of a single conjugated diene such as 1,3-butadiene, and copolymers of two or more conjugated dienes including 1,3-butadiene, isoprene (2-methyl-1,3-butadiene), 2,3-dimethyl-1,3-butadiene, 1,3-pentadiene, etc., at least 80% of the unsaturated bonds contained in said homopolymers or copolymers having been reduced by hydrogenation.

The hydrogenated copolymer of a conjugated diene and an aromatic vinyl hydrocarbon includes block or random copolymers which vary in the ratio between the conjugated diene and the aromatic vinyl hydrocarbon, at least 80% of the unsaturated bonds contained in said block or random copolymers having been reduced by hydrogenation. In this case, block copolymers of a conjugated diene and an aromatic vinyl hydrocarbon are preferably used. The double bonds of aromatic nuclei are excluded from the unsaturated bonds reduced by hydrogenation.

The conjugated diene(s) used as starting material(s) for the hydrogenated polymer and the hydrogenated copolymer include 1,3-butadiene, isoprene (2-methyl-1,3-butadiene), 1,3-pentadiene, etc. Of these, 1,3-butadiene and isoprene are advantageously used.

The aromatic vinyl hydrocarbon used as a starting material for the hydrogenated copolymer includes styrene, α-methylstyrene, o-methylstyrene, p-methylstyrene, 1,3-dimethylstyrene, vinylnaphthalene, etc. Of these, styrene is advantageously used.

Preferable specific examples of the hydrogenated polymer and the hydrogenated copolymer among those obtained from the above exemplified conjugated dienes and aromatic vinyl hydrocarbons are hydrogenated polybutadienes, styrene-butadiene-styrene tri-block hydrogenated copolymers, styrene-isoprene-styrene triblock hydrogenated copolymers, etc. Of these, styrene-butadiene-styrene tri-block hydrogenated copolymers are preferably used from the viewpoint of heat resistance.

The weight average molecular weight of the hydrogenated polymer or copolymer is 10,000 to 1,000,000, preferably 20,000 to 800,000, and most preferably 30,000 to 500,000.

The unsaturated carboxylic acid, anhydride thereof or derivative of either of them, to be graft copolymerized onto the hydrogenated polymer or copolymer as the backbone component includes mainly mono- or dicarboxylic acids of the unsaturated aliphatic series, alicyclic series or the like, anhydrides of these carboxylic acids, or derivatives of these carboxylic acids and anhydrides (e.g. esters, imides, amides, substituted derivatives, etc.). Specific examples of the unsaturated carboxylic acid, anhydride thereof or derivative of either of them are acrylic acid, methacrylic acid, maleic acid, fumaric acid, itaconic acid, crotonic acid, methylmaleic acid, methylfumaric acid, mesaconic acid, citraconic acid, glutaconic acid, methyl hydrogenmaleate, ethyl hydrogenmaleate, methyl hydrogenfumarate, ethyl hydrogenfumarate, methyl itaconate, maleic anhydride, itaconic anhydride, methylmaleic anhydride, citraconic anhydride, endobicyclo-[2,2,1]-5-heptene-2,3-dicarboxylic acid, endobicyclo-[2,2,1]-5-heptene-2,3-dicarboxylic acid anhydride, etc. Of these, maleic anhydride is preferably used.

The proportion of these graft components copolymerized is preferably 0.05 to 10.0% by weight, particularly 0.1 to 5.0% by weight, based on the weight of the hydrogenated polymer or copolymer. When the proportion is less than 0.05% by weight, the desired effect cannot be obtained. When the proportion exceeds 10.0% by weight, there are various problems, for example, gelation occurs during melt kneading with the PPS, or a seriously discolored composition having an ugly appearance is obtained.

The term "graft copolymerization" used herein means that a portion or the whole of the backbone hydrogenated polymer or copolymer is chemically combined with the unsaturated carboxylic acid, anhydride thereof or derivative of either of them. The hydrogenated polymer or copolymer and the graft component can usually be reacted with each other in a solution, suspended state, slurry state, or molten state by a conventional method.

As still other useful alloy type elastomers, there are known products obtained by reacting an unsaturated carboxylic acid glycidyl ester with a hydrogenated polymer of one or more conjugated dienes or a hydrogenated copolymer of a conjugated diene and an aromatic vinyl hydrocarbon.

The α,β-unsaturated acid glycidyl ester to be reacted with the hydrogenated polymer or copolymer is represented by the general formula:

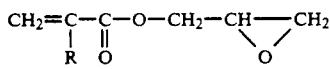

wherein R is a hydrogen atom or a lower alkyl group. Specific examples thereof are glycidyl acrylate, glycidyl methacrylate, glycidyl ethacrylate, etc.

As methods for reacting the α,β-unsaturated acid glycidyl ester with the hydrogenated polymer or copolymer, they can be reacted with each other in a solution or molten state in the presence or absence of a free-radical initiator. There can be exemplified a method which comprises reacting the α,β-unsaturated acid glycidyl ester with the hydrogenated polymer or copolymer in the presence of a free-radical initiator in an extruder.

The above glycidyl ester component is usually added as a graft component to the hydrogenated polymer or copolymer.

The proportion of the glycidyl ester component copolymerized is preferably 0.01 to 10.0% by weight, particularly 0.1 to 5.0% by weight, based on the weight of the hydrogenated polymer or copolymer. When it is less than 0.05% by weight, the desired effect cannot be obtained. When the proportion exceeds 10.0% by weight, there are various problems, for example, gelation occurs during melt kneading with the PPS, or a seriously discolored composition having an ugly appearance is obtained.

Suitable proportions of the PPS and the elastomer(s) blended therewith as component(s) (B) are 70 to 99% by weight and 30 to 1% by weight, respectively, based on the total weight of the PPS and the elastomer(s). When the proportion of the PPS exceeds 99% by weight and that of the elastomer(s) is less than 1% by weight, only insufficient brittleness-improving effect can be obtained.

When the proportion of the PPS is less than 70% by weight and that of the elastomer(s) exceeds 30% by weight, the strength, stiffness and heat resistance of the PPS tend to be deteriorated and moreover, in some cases, gelation occurs during melt kneading, resulting in deterioration of the extrusion stability and the moldability. Therefore, the proportions of the PPS and the elastomer(s) are preferably 70 to 97% by weight and 30 to 3% by weight, respectively; more preferably 75 to 95% by weight and 25 to 5% by weight, respectively; and most preferably 80 to 90% by weight and 20 to 10% by weight, respectively.

Although the order of mixing is not critical in melt-kneading the PPS, the isocyanate compound and the elastomer(s), it is preferable to melt-knead the PPS with the isocyanate compound and then knead the elastomer(s) with them. As a simplified method, there can also be employed a method comprising mixing the PPS, the isocyanate compound and the elastomer(s) at the same time.

It is important that the particle diameter of the elastomer(s) dispersed in the PPS in the polyphenylene sulfide resin composition thus obtained is 1 μm or less.

For obtaining a larger impact-properties-improving effect, the particle diameter is preferably 0.5 μm or less, particularly 0.3 μm or less. When the particle diameter exceeds 1 μm, improvement of the impact properties is not sufficient and the moldability is deteriorated. Therefore, such a particle diameter is not practical.

Although the lower limit of the diameter of dispersed particles of the elastomer(s) is not critical in the present invention, the particle diameter is usually preferably 0.05 μm or more.

The diameter of dispersed particles of the elastomer(s) in the composition of present invention refers to a numerical value measured in the following manner. A molded piece of a composition composed of the PPS and the elastomer(s) is cooled with liquid nitrogen, and its ruptured cross-section is subjected to extraction treatment with chloroform for 72 hours by boiling, to extract and remove the elastomers. The voids present in the molded piece after the extraction and removal of the elastomer(s) are measured by observation under a scanning electron microscope, and the thus measured diameter of the voids is defined as the particle size of the elastomer(s).

The composition of the present invention is excellent not only in impact resistance but also in heat aging characteristics.

Polyphenylene sulfides themselves are well known as aromatic resins excellent in heat aging characteristics.

On the other hand, the heat aging characteristics of the elastomer(s) used in the present invention are generally considered to be not very good. The reason for their unsatisfactory heat aging characteristics is considered to be that the molecular skelton of the elastomer(s)

itself (themselves) is based on aliphatic hydrocarbon linkages, so that the molecular bonds of the elastomer(s) are thermally weaker than those of aromatic molecular chains.

In general, it is considered that when polymers are blended, the heat aging characteristics of the blend is approximate to the weighted mean of the heat aging characteristics of the blended polymers.

However, in the present invention, it was found that molded products of the composition of the present invention are superior to the polyphenylene sulfide itself in heat aging characteristics at a high temperature (250° C.). This fact is surprising from a common sense point of view. This is because it is considered that the molecular chain of the elastomer(s) dispersed in the polyphenylene sulfide is thermally weak and hence age faster than the molecular chain of the polyphenylene sulfide.

Although the reason why the heat aging characteristics of molded products according to the present invention are excellent is not clear, it is presumed to be that fine particles of the elastomer(s) dispersed in the polyphenylene sulfide resin prevent diffusion of oxygen during heat aging in air at a high temperature.

In the present invention, the same impact-resistance-improving effect can be obtained also by adding a polyamide or the like to a modified polyphenylene sulfide resin obtained by melt-kneading a polyphenylene sulfide resin with a polyfunctional isocyanate compound.

That is, the following resin composition is also excellent in impact resistance:

a resin composition comprising a blend of (A) a modified polyphenylene sulfide resin obtained by melt-kneading a polyphenylene sulfide resin with a non blocked type polyfunctional isocyanate compound, (A') a polyamide resin, and (B) at least one elastomer selected from the group consisting of (i) an ethylene copolymer comprising 50 to 90% by weight of ethylene units, 5 to 49% by weight of $\alpha,\beta$-unsaturated carboxylic acid alkyl ester units, and 0.5 to 10% by weight of maleic anhydride units, (ii) an epoxy group containing olefin copolymer, (iii) an ionomer resin, and (iv) an $\alpha$-olefin copolymer elastomer obtained by graft copolymerizing an unsaturated carboxylic acid or an anhydride thereof onto an $\alpha$-olefin polymer, in the following weight ratios:

$(A)/(A') = 30/70 - 90/10$ $(B)/\{(A)+(A')\} = 2/100 - 50/100.$

The polyamide resin useful in the present invention includes 6-nylon, 46-nylon, 66-nylon, 6.10-nylon, 66/6.10-nylon, 6/66-nylon, 12-nylon, 11-nylon, 6/6T nylon (a copolymer of caprolactam and a salt of terephthalic acid with hexamethylenediamine), etc. Of these, 6-nylon, 46-nylon and 66-nylon are preferable, and 66-nylon is particularly preferable.

In this invention, as elastomer(s) capable of strongly adhering the PPS to the polyamide resin at the boundary surface between them, there is used at least one elastomer selected from the group consisting of an ethylene copolymer comprising 50 to 90% by weight of ethylene units, 5 to 49% by weight of $\alpha,\beta$-unsaturated carboxylic acid alkyl ester units, and 0.5 to 10% by weight of maleic anhydride units; an epoxy group containing olefin copolymer; an ionomer resin; and an $\alpha$-olefin copolymer elastomer obtained by graft copolymerizing an unsaturated carboxylic acid or an anhydride thereof onto an $\alpha$-olefin polymer.

In this invention, the mixing ratio of the modified PPS (A) to the polyamide resin (A') is in the following range: $(A)/(A') = 30/70 - 90/10$ by weight. When the proportion of the modified PPS (A) exceeds 90% by weight, only an insufficient improving effect on the modified PPS (A) can be obtained. When it is less than 30% by weight, inherent characteristics of the modified PPS are greatly lost. Therefore, both of such proportions are not desirable. The mixing ratio is more preferably: $(A)/(A') = 40/60 - 80/20$ by weight.

The amount of the elastomer(s) (B) is 2 to 50 parts by weight, preferably 5 to 30 parts by weight, per 100 parts by weight of the sum of the modified PPS (A) and the polyamide resin (A'). When the amount of the elastomer(s) is more than 50 parts by weight, the mechanical strength, thermal properties, molding processability and the like of the resulting molded product are deteriorated. When it is less than 2 parts by weight, the effects of the present invention cannot be sufficiently obtained and the present invention is difficult to accomplish.

In the present invention, the flame retardancy is deteriorated in some cases. The deterioration is due to combustion of the elastomer(s) in the polyphenylene sulfide.

The present inventor found that addition of a bromine-containing flame retardant is effective in improving the flame retardancy while maintaining the above desirable physical properties.

That is, the present inventor found that the above purpose can be achieved by a resin composition comprising a blend of (A) a modified polyphenylene sulfide resin obtained by melt-kneading a polyphenylene sulfide resin with a non-blocked type polyfunctional isocyanate compound, (B) at least one elastomer selected from the group consisting of (i) an ethylene copolymer comprising 50 to 90% by weight of ethylene units, 5 to 49% by weight of $\alpha,\beta$-unsaturated carboxylic acid alkyl ester units and 0.5 to 10% by weight of maleic anhydride units, (ii) an epoxy group containing olefin copolymer, and (iii) an ionomer, and (C) an organic flame retardant containing 30 to 80% by weight of bromine atoms, in the following weight ratios:

$(A)/(B) = 50/50 - 95/5$ $(C)/\{(A)+(B)\} = 1/100 - 40/100.$

In this invention, an organic flame retardant containing 30 to 80% by weight of bromine atom is used for improving the flame retardancy. It is important that the flame retardant used in this invention is a bromine-containing organic substance. Organic substances having any structure can be used so long as they contain one or more bromine atoms.

The flame retardant used in this invention includes brominated polystyrenes, brominated epoxies, brominated modified epoxies, etc. The bromine atom content of these compounds is 30 to 80% by weight, preferably 45 to 75% by weight, and most preferably 50 to 70% by weight.

Since the components (A), (B) and (C) are melt-kneaded together at a temperature higher than the melting point of the PPS, the decomposition temperature of the flame retardant added is 280° C. or higher, preferably 300° C. or higher, and most preferably 320° C. or higher.

In addition since, in some cases, a compound having a low molecular weight is not fixed in the resin but bleeds out of the resin surface, a compound having a relatively high molecular weight is preferably used as the flame retardant. It is preferable that the flame retardant is sufficiently dispersed in the resin composition and compatibilized with the other components, and hence its melting point is preferably 280° C. or lower. Therefore, the melt index value of the flame retardant is 0.1 to 1,000, preferably 0.2 to 500, and most preferably 1 to 150, at 280° to 320° C., from the viewpoint of its molecular weight and melting point.

Of such brominated products, brominated polystyrenes are preferably used because they only slightly deteriorate the mechanical properties of the resin composition.

Of the above-exemplified flame retardants, a suitable brominated polystyrene is commercially available from Nissan Ferro by the name of Pyrocheck, and a suitable brominated epoxy and brominated modified epoxy are commercially available from Dainippon Ink and Chemicals, Inc. by the name of Platherm.

In this invention, the flame retardant is incorporated into the resin composition in an amount of 1 to 40 parts by weight per 100 parts by weight of the resin composition. When the amount exceeds 40 parts by weight, the mechanical properties of the resin composition are deteriorated. The mixing ratio is preferably: $(C)/\{(A)+(B)\} = 5/100 - 30/100$.

In the present invention, a fibrous reinforcing agent or a granular reinforcing agent, or both, can optionally be blended in an amount of not more than 300 parts by weight per 100 parts by weight of the sum of the PPS and the elastomer(s) or the sum of the PPS, the polyamide and the elastomer(s) though the reinforcing agent(s) are not essential constituent(s). The strength, stiffness, heat resistance, dimensional stability, etc. can be improved by blending the reinforcing agent(s) usually in an amount of 10 to 300 parts by weight per 100 parts by weight of the sum of the PPS and the elastomer(s) or the sum of the PPS, the polyamide and the elastomer(s).

Suitable fibrous reinforcing agents include inorganic fibers (e.g. glass fiber, alumina fiber, silicon carbide fiber, ceramic fiber, asbestos fiber, gypsum fiber, metallic fibers, etc.), carbon fiber, and the like.

Suitable granular reinforcing agents include silicates (e.g. wollastonite, sericite, kaolin, mica, clay, bentonite, asbestos, talc, alumina silicate, etc.), metal oxides (e.g. alumina, silicon oxide, magnesium oxide, zirconium oxide, titanium oxide, etc.), carbonates (calcium carbonate, magnesium carbonate, dolomite, etc.), sulfates (e.g. calcium sulfate, barium sulfate, etc.), glass beads, boron nitride, silicon carbide, silica, and the like. These may be hollow (porous). The above-exemplified reinforcing agents can be used singly or in combinations of two or more thereof, and, if necessary, they can be used after being pretreated with a coupling agent such as a silane-containing coupling agent, titanium-containing coupling agent, or the like.

Although a means for preparing the composition of the present invention is not critical, a typical example thereof is a method which comprises first melt-kneading the PPS and the isocyanate compound, then the elastomer(s) and optionally the polyamide, and then the reinforcing agent(s), in an extruder at a temperature higher than the melting point of the PPS, and then pelletizing the resulting mixture.

The melt kneading temperature is preferably 280° to 340° C. When it is lower than 280° C., the PPS is not sufficiently melted in some cases. When it is higher than 340° C., the elastomer(s) and in some cases the polyamide tend to undergo heat deterioration or gelation. Therefore, care should be taken.

The present invention is illustrated in more detail with reference to the following examples which are not intended to imply any restriction on the invention.

REFERENTIAL EXAMPLE 1

Preparation of Isocyanate-treated PPS

PPS powder (Tohpren T-4) was dried at 150° C. for 3 hours, after which the temperature was lowered to 50° C. and 4,4'-diphenylmethane diisocyanate was blended in an amount of 2 parts by weight per 100 parts by weight of the PPS. They were mixed in a Henschel mixer under nitrogen for 30 seconds and then pelletized with a twin screw extruder (PCM-30, mfd. by Ikegai Corporation) under nitrogen at a cylinder temperature of 290° to 300° C.

EXAMPLE 1

The pellets obtained in Referential Example 1 and pellets of ethylene copolymer comprising 67% of ethylene units, 30.5% of ethyl acrylate units and 2.5% of maleic anhydride units and having a melt index value of 2.0 were dry blended in a ratio of 90:10 by weight, fed to a twin screw kneading and extruding machine, melt-kneaded at 310° C., extruded into a strand, and then cut to obtain pellets of a composition composed of the above materials.

These pellets were injection-molded at 290° to 320° C. with an injection molding machine to obtain test pieces for measuring physical properties.

For evaluating the impact resistance, the Izod impact strength was measured for the thus obtained test pieces in accordance with the method of ASTM D-256.

The result obtained is shown in Table 1.

EXAMPLE 2

The process of Example 1 was repeated except for dry blending the pellets of Referential Example 1 and the ethylene copolymer pellets of Example 1 in a ratio of 80:20 by weight.

The result obtained is also shown in Table 1.

EXAMPLE 3

The process of Example 1 was repeated except for dry blending the pellets of Referential Example 1 and pellets of an ethylene copolymer comprising 80% of ethylene units, 18% of acrylic acid units and 2% of maleic anhydride units and having a melt index value of 500, in a ratio of 90:10 by weight.

The result obtained is also shown in Table 1.

EXAMPLE 4

The process of Example 1 was repeated except for dry blending the pellets of Referential Example 1 and the ethylene copolymer pellets of Example 3 in a ratio of 80:20 by weight.

The result obtained is also shown in Table 1.

EXAMPLE 5

The pellets obtained in Example 1 and glass fiber (ECS03-T717 DE, mfd. by Nippon Electric Glass Co., Ltd.) were dry blended in a ratio of 60:40 by weight, melt-kneaded together at 310° C., extruded into a strand, and then cut into pellets. Thereafter, in the same manner as in Example 1, the pellets were injection-molded and then subjected to evaluation of physical properties.

The result obtained is also shown in Table 1.

EXAMPLE 6

The process of Example 1 was repeated except for dry blending the pellets of Referential Example 1, the ethylene copolymer pellets of Example 3 and glass fiber (ECS03-T717 DE, mfd. by Nippon Electric Glass Co., Ltd.) in a ratio of 80:20:67 by weight.

The result obtained is also shown in Table 1.

COMPARATIVE EXAMPLE 1

The process of Example 1 was repeated, except that the ethylene copolymer pellets of Example 1 were not blended.

The result obtained is shown in Table 2.

COMPARATIVE EXAMPLE 2

Pellets were obtained in the same manner as in Example 5 except for dry blending the pellets obtained in Comparative Example 1 and glass fiber (ECS03-T717 DE, mfd. by Nippon Electric Glass Co., Ltd.) in a ratio of 60:40 by weight, and evaluated in the same manner as in Example 5.

The result obtained is also shown in Table 2.

COMPARATIVE EXAMPLE 3

The process of Example 6 was repeated except for dry blending the pellets of Referential Example 1 and glass fiber (ECS03-T717 DE, mfd. by Nippon Electric Glass Co., Ltd.) in a ratio of 100:67 by weight.

The result obtained is also shown in Table 2.

COMPARATIVE EXAMPLE 4

The process of Example 1 was repeated except for dry blending PPS powder (Tohpren T-4) and the ethylene copolymer pellets of Example 1 in a ratio of 90:10 by weight.

The result obtained is also shown in Table 3.

COMPARATIVE EXAMPLE 5

Pellets were obtained in the same manner as in Comparative Example 2 except for dry blending the pellets obtained in Comparative Example 4 and glass fiber (3 mm) (ECS03-T717DE, mfd. by Nippon Electric Glass Co., Ltd.) in a ratio of 60:40 by weight, and evaluated in the same manner as in Comparative Example 2.

The result obtained is also shown in Table 3.

EXAMPLE 7

The pellets of Referential Example 1 and an ethylene copolymer comprising 60% of ethylene units, 37.5% of ethyl acrylate units and 2.5% of maleic anhydride units and having a melt index value of 0.2 were dry blended in a ratio of 80:20 by weight. The physical property data measured for the resulting blend are also shown in Table 1.

TABLE 1

| Example | Blending proportion PPS (MDI treatment) | Ethylene co-polymer | Glass fiber | Notched Izod impact strength (kg · cm/cm) | Diameter of dispersed particles |
|---|---|---|---|---|---|
| 1 | 90 | 10* | — | 27 | 0.5μ or less |
| 2 | 80 | 20* | — | 76 | 0.4μ or less |
| 3 | 90 | 10** | — | 25 | 0.6μ or less |
| 4 | 80 | 20** | — | 45 | 0.5μ or less |
| 5 | 54 | 6* | 40 | 16 | — |
| 6 | 80 | 20** | 67 | 23 | — |
| 7 | 80 | 20*** | — | 74 | 0.4μ or less |

*Ethylene-ethyl acrylate-maleic anhydride: 67/30.5/2.5 melt index 2.0
**Ethylene-acrylic acid-maleic anhydride: 80/18/2.0 melt index 500
***Ethylene-ethyl acrylate-maleic anhydride: 60/37.5/2.5 melt index 0.2

TABLE 2

| Comparative Example | Blending proportion PPS (MDI treatment) | Ethylene copolymer | Glass fiber | Notched Izod impact strength (kg · cm/cm) |
|---|---|---|---|---|
| 1 | 60 | — | — | 2.5 |
| 2 | 60 | — | 40 | 7.2 |
| 3 | 100 | — | 67 | 7.3 |

TABLE 3

| Comparative Example | Blending proportion PPS (MDI treatment) | Ethylene co-polymer | Glass fiber | Notched Izod impact strength (kg · cm/cm) | Diameter of dispersed particles |
|---|---|---|---|---|---|
| 4 | 90 | 10* | — | 3.3 | 2μ or more |
| 5 | 54 | 6* | 40 | 9.1 | — |
| 6 | 160 | — | — | 1.8 | — |
| 7 | 60 | — | 40 | 7.0 | — |

COMPARATIVE EXAMPLE 6

The process of Example 1 was repeated except for using PPS powder (Tohpren T-4) alone.

The result obtained is shown in Table 3.

COMPARATIVE EXAMPLE 7

The process of Comparative Example 2 was repeated except for dry blending the pellets obtained in Comparative Example 6 and glass fiber in a ratio of 60:40 by weight.

The result obtained is shown in Table 3.

EXAMPLE 8

Dumbbell specimens were formed by injection molding by using the pellets obtained in each of Example 6, Comparative Example 7 and Comparative Example 5, and were subjected to heat aging at 250° C. Their tensile strength after the aging was measured and the retention of strength was calculated. The results obtained are shown in Table 4. The molded product according to the present invention showed a very high retention of strength.

TABLE 4

Retention of tensile strength after heat aging (250° C.)
(Example 8)

| Sample | Initial strength (kg/cm²) | Retention of strength (%) 100 hours | 250 hours | 500 hours |
|---|---|---|---|---|
| Example 6 (modified PPS/elastomer/GF) | 1,400 | 100 | 97 | 95 |
| Comparative Example 7 (PPS/GF) | 1,600 | 85 | 75 | 72 |
| Comparative Example 5 (PPS/elastomer/GF) | 1,100 | 82 | 71 | 67 |

EXAMPLE 9

The diameter of dispersed particles of each elastomer in PPS resin was measured. The particle diameters of the elastomers in Example 1, Example 2, Example 3, Example 4 and Example 7 were measured. Their dispersed particle diameters were 0.4 to 0.6N or less. On the other hand, for comparison, the diameter of dispersed particles in Comparative Example 4 was measured to be 2 μm or more. These measurement results are also shown in Table 1 and Table 3.

EXAMPLES 10 TO 24

The pellets obtained in Referential Example 1 and each of various elastomers were mixed in various ratios, and subjected to the same procedure as in Example 1. The results obtained are summarized in Table 5.

COMPARATIVE EXAMPLES 8 TO 22

The process of Example 10 was repeated except for using the pellets obtained in Comparative Example 6, in place of the pellets obtained in Referential Example 1. The result obtained is also shown in Table 5.

EXAMPLES 25 TO 36

The pellets obtained in Referential Example 1, nylon 66 and each of various elastomers were blended and then subjected to the same procedure as in Example 1 and Example 2. The results obtained are summarized in Table 6.

TABLE 5

| No. | PPS (MDI treatment) | PPS | Elastomer | Glass fiber | Notched Izod impact strength (kg · cm/cm) |
|---|---|---|---|---|---|
| Example 10 | 90 | | 10[1] | — | 20 |
| Comparative Example 8 | | 90 | 10[1] | — | 6 |
| Example 11 | 80 | | 20[1] | — | 65 |
| Comparative Example 9 | | 80 | 20[1] | — | 8 |
| Example 12 | 80 | | 20[1] | 67 | 21 |
| Comparative Example 10 | | 80 | 20[1] | 67 | 9.5 |
| Example 13 | 90 | | 10[3] | — | 16 |
| Comparative Example 11 | | 90 | 10[3] | — | 3.3 |
| Example 14 | 80 | | 20[3] | — | 50 |
| Comparative Example 12 | | 80 | 20[3] | — | 6 |
| Example 15 | 80 | | 20[3] | 67 | 19 |
| Comparative Example 13 | | 80 | 20[3] | 67 | 9 |
| Example 16 | 90 | | 10[4] | — | 8 |
| Comparative Example 14 | | 90 | 10[4] | — | 4.2 |
| Example 17 | 80 | | 20[4] | — | 15 |
| Comparative Example 15 | | 80 | 20[4] | — | 8.3 |
| Example 18 | 80 | | 20[4] | 67 | 15 |
| Comparative Example 16 | | 80 | 20[4] | 67 | 10 |
| Example 19 | 90 | | 10[5] | — | 16 |
| Comparative Example 17 | | 90 | 10[5] | — | 2.6 |
| Example 20 | 80 | | 20[5] | — | 39 |
| Comparative Example 18 | | 80 | 20[5] | — | 3.5 |
| Example 21 | 80 | | 20[5] | 67 | 15 |
| Comparative Example 19 | | 80 | 20[5] | 67 | 7 |
| Example 22 | 90 | | 10[6] | — | 9 |
| Comparative Example 20 | | 90 | 10[6] | — | 3 |
| Example 23 | 80 | | 20[6] | — | 16 |
| Comparative Example 21 | | 80 | 20[6] | — | 3 |
| Example 24 | 80 | | 20[7] | — | 15 |
| Comparative Example 22 | | 80 | 20[7] | — | 3 |

[1] Ethylene-glycidyl methacrylate copolymer
[3] Ethylene-methacrylic acid copolymer (Nucrel No. 10, a trade name, mfd. by Mitsui DuPont Petrochemical)
[4] ionomer (Bondfast ® 2B)
[5] maleic anhydride-grafted ethylene-propylene copolymer (Toughmer MPO610, mfd. by Mitsui Petrochemical Industries Ltd.)
[6] 2.1% maleic anhydride-added hydrogenated styrene-butadiene-styrene block copolymer (15/70/15 by weight)
[7] 1.2% glycidyl methacrylate-added hydrogenated styrene-butadiene-styrene block copolymer (15/70/15)

TABLE 6

| Example | Blending proportion (parts by weight) | | | Physical properties | | |
|---|---|---|---|---|---|---|
| | Modified PPS | Nylon 66 | Elastomer | Tensile strength (Kg/cm²) | Breaking extension (%) | Notched Izod impact strength (kg · cm/cm) |
| Example 25 | 80 | 20 | MEA 11 | 600 | 30 | 20 |
| Example 26 | 80 | 20 | MEA 22 | 550 | 65 | 70 |
| Example 27 | 80 | 20 | EOC 11 | 600 | 25 | 20 |
| Example 28 | 80 | 20 | EOC 22 | 550 | 55 | 60 |
| Example 29 | 80 | 20 | ION 11 | 600 | 14 | 14 |
| Example 30 | 80 | 20 | ION 22 | 550 | 34 | 28 |
| Example 31 | 60 | 40 | MEA 10 | 550 | 30 | 25 |
| Example 32 | 60 | 40 | MEA 20 | 500 | 70 | 75 |
| Example 33 | 60 | 40 | EOC 20 | 500 | 40 | 54 |
| Example 34 | 60 | 40 | MEA 10 EOC 10 | 500 | 41 | 60 |
| Example 35 | 60 | 40 | ION 20 | 500 | 36 | 40 |
| Example 36 | 60 | 40 | EOC 10 | 500 | 38 | 50 |

TABLE 6-continued

| Example | Blending proportion (parts by weight) | | | Physical properties | | |
|---|---|---|---|---|---|---|
| | Modified PPS | Nylon 66 | Elastomer | Tensile strength (Kg/cm²) | Breaking extension (%) | Notched Izod impact strength (kg · cm/cm) |
| | | | ION 10 | | | |

*MEA: maleic anhydride-containing ethylene-acrylic ester copolymer
EOC: epoxy group-containing olefin copolymer
ION: ionomer resin

EXAMPLE 37

The process of Example 26 was repeated except for using nylon 46 ("Stannyl", mfd. by DSM Corp. in Netherlands) as the polyamide resin in place of the nylon 66.

The product thus obtained had the following physical properties: tensile strength 540 kg/cm², breaking extension 28%, notched Izod impact strength 24 kg·cm/cm.

EXAMPLE 38

The process of Example 26 was repeated except for using nylon 6 (Ube Nylon 1013B, mfd. by Ube Industries, Ltd.) as the polyamide resin. The product thus obtained had the following physical properties: tensile strength 480 kg/cm², breaking extension 26%, notched Izod impact strength 20 kg·cm/cm.

COMPARATIVE EXAMPLES 23 TO 25

The process of Example 26, Example 28 and Example 30, respectively, was repeated except for using the unmodified PPS pellets obtained in comparative Example 6. The products thus obtained were clearly inferior in Izod impact strength to those obtained in Examples 26, 28 and 30. The results obtained are shown in Table 7.

TABLE 7

| Comparative Example | Blending proportion (parts by weight) | | | | | Notched Izod impact strength (kg · cm/cm) |
|---|---|---|---|---|---|---|
| | Unmodified PPS | Nylon 66 | Elastomer | | | |
| | | | Maleic anhydride-containing ethylene-acrylic ester copolymer | Epoxy group-containing olefin copolymer | Ionomer resin | |
| Comparative Example 23 | 80 | 20 | 22 | — | — | 12 |
| Comparative Example 24 | 80 | 20 | — | 22 | — | 12 |
| Comparative Example 25 | 80 | 20 | — | — | 22 | 6 |

COMPARATIVE EXAMPLE 26

Combustion Test

Test pieces were obtained from the pellets obtained in Example 2 by a conventional injection molding method under the following conditions: cylinder temperatures: hopper portion 240° C., middle portion 290° C., tip portion 300° C.; mold temperature 140° C. The test pieces were subjected to measurement of various physical properties. The results obtained are shown in Table 8.

EXAMPLE 39

100 Parts by weight of the pellets obtained in Example 2, 4 parts by weight of a brominated polystyrene (Pyrocheck 68PB mfd. by Nissan Ferro) and 1 part by weight of antimony trioxide were mixed in a V blender, and melt-kneaded by means of a twin rotary screw (same direction) extruder PCM-30 mfd. by Ikegai Corporation whose cylinder temperatures had been set as follows: hopper portion 240° C., middle portion 295° C., tip portion 295° C. Pellets were obtained from the melt-kneaded product by a conventional method. Test pieces were obtained from the thus obtained pellets by a conventional injection molding method under the following conditions: cylinder temperatures: hopper portion 240° C., middle portion 290° C., tip portion 290° C.; mold temperature 140° C. The test pieces were subjected to measurement of various physical properties. The results obtained are summarized in Table 8.

EXAMPLE 40

The process of Example 39 was repeated except for changing the proportions of the pellets obtained in Example 2, brominated polystyrene (Pyrocheck 68PB mfd. by Nissan Ferro) and antimony trioxide to 100 parts by weight, 8 parts by weight and 2 parts by weight, respectively. The results obtained are summarized in Table 8.

It can be seen that the product obtained in Example 40 has an improved flame retardancy while retaining tensile strength and impact strength, as compared with the product obtained in Comparative Example 26.

TABLE 8

| | | Example 39 | Example 40 | Comparative Example 26 |
|---|---|---|---|---|
| Modified PPS | (parts by weight) | 80 | 80 | 80 |
| Elastomer | " | 20 | 20 | 20 |
| Brominated PS | " | 4 | 8 | 0 |
| Antimony trioxide | " | 1 | 2 | 0 |
| Tensile strength | (kg f/cm²) | 548 | 557 | 550 |
| Notched Izod impact strength | (kg · cm/cm) | 48 | 48 | 50 |
| Combustibility | (UL94) | V - 1 | V - 0 | HB |

EXAMPLE 41

100 Parts by weight of PPS powder (Tohpren T-4), 2 parts by weight of 4,4-diphenylmethane diisocyanate and 25 parts by weight of the same ethylene copolymer as used in Example 2 were mixed and then extruded with a twin screw kneading and extruding machine. The Izod impact strength of a product molded out of the pellets thus obtained was 75 kg·cm/cm.

The composition of the present invention is obtained by blending a polyphenylene resin subjected to a specific treatment, with at least one elastomer having a specific functional group. Therefore, the present invention is effective in that a polyphenylene sulfide resin composition can be obtained which possesses particularly improved impact properties, as compared with unmodified polyphenylene resins, and polyphenylene sulfide resins subjected to the specific treatment which do not contain the aforesaid elastomer(s) blended therewith.

What is claimed is:

1. A polyphenylene sulfide resin composition possessing improved impact properties consisting essentially of
   (A) a polyphenylene sulfide resin containing a non-blocked type polyfunctional isocyanate compound melt-kneaded therewith, and
   (B) an ethylene copolymer elastomer comprising 50 to 90% by weight of ethylene units, 5 to 49% by weight of α,β-unsaturated carboxylic acid alkyl ester units and 0.5 to 10% by weight of maleic anhydride units.

2. A resin composition according to claim 1, wherein said polyphenylene sulfide resin, said isocyanate compound and the elastomer(s) are mixed at the same time.

3. A resin composition according to claim 1, wherein the particle diameter of the ethylene copolymer comprising 50 to 90% by weight of ethylene units, 5 to 49% by weight of α,β-unsaturated carboxylic acid alkyl ester units and 0.5 to 10% by weight of maleic anhydride units which is dispersed in the PPS is 1 μm or less.

4. A resin composition consisting essentially of a blend of
   (A) a modified polyphenylene sulfide resin obtained by melt-kneading a polyphenylene sulfide resin with a non-blocked type polyfunctional isocyanate compound,
   (A') a polyamide resin, and
   (B) an ethylene copolymer elastomer comprising 50 to 90% by weight of ethylene units, 5 to 49% by weight of α,β-unsaturated carboxylic acid alkyl ester units and 0.5 to 10% by weight of maleic anhydride units, in the following weight ratios:

$$(A)/(A') = 30/70 - 90/10$$

$$(B)/\{(A)+(A')\} = 2/100 - 50/100$$

5. A resin composition consisting essentially of a blend of
   (A) a modified polyphenylene sulfide resin obtained by melt-kneading a polyphenylene sulfide resin with a non-blocked type polyfunctional isocyanate compound,
   (B) an ethylene copolymer elastomer comprising 50 to 90% by weight of ethylene units, 5 to 49% by weight of α,β-unsaturated carboxylic acid alkyl ester units and 0.5 to 10% by weight of maleic anhydride units,
   (C) an organic flame retardant containing 30 to 80% by weight of bromine atoms,
   in the following weight ratios:

$$(A)/(B) = 50/50 - 95/5$$

$$(C)/\{(A)+(B)\} = 1/100 - 40/100.$$

* * * * *